United States Patent [19]

Walker et al.

[11] Patent Number: 5,893,434
[45] Date of Patent: Apr. 13, 1999

[54] LINING WEAR INDICATOR FOR A DRUM BRAKE

[75] Inventors: Donald G. Walker, Troy; David J. Dettloff, Utica; David J. Edwards, Shelby Township, all of Mich.; Roger Gooch, Chatham, Canada

[73] Assignee: Meritor Heavy Vehicle Systems, LLC, Troy, Mich.

[21] Appl. No.: 08/839,272

[22] Filed: Apr. 17, 1997

[51] Int. Cl.$^6$ ...................................... F16D 66/00
[52] U.S. Cl. .................. 188/1.11 W; 188/1.11 R
[58] Field of Search ............... 188/1.11 R, 1.11 W, 188/325, 326

[56] References Cited

U.S. PATENT DOCUMENTS

| | | | |
|---|---|---|---|
| 2,217,176 | 10/1940 | Madison | 200/52 |
| 2,709,505 | 5/1955 | Dodge | 188/325 |
| 3,138,224 | 6/1964 | White | 188/78 |
| 3,141,524 | 7/1964 | Mishler | 188/1.11 W |
| 3,385,256 | 5/1968 | Forbush | 188/1.11 W X |
| 4,037,689 | 7/1977 | Machara | 188/1 A |
| 4,085,826 | 4/1978 | Ritsema et al. | 188/1.11 W |
| 4,124,105 | 11/1978 | Machara | 188/1 A |
| 4,250,978 | 2/1981 | Borkowski | |
| 4,344,509 | 8/1982 | Hermer | 188/1.11 |
| 4,437,547 | 3/1984 | Harmer | 188/1.11 |
| 4,460,067 | 7/1984 | Katagiri et al. | 188/1.11 |
| 5,033,590 | 7/1991 | Kobayashi et al. | 188/1.11 |
| 5,117,947 | 6/1992 | Kobayashi et al. | 188/1.11 |
| 5,139,114 | 8/1992 | Rodriquez et al. | 188/1.11 |
| 5,261,508 | 11/1993 | Kikuchi | 188/1.11 |
| 5,299,663 | 4/1994 | Kobayashi et al. | 188/1.11 |
| 5,339,928 | 8/1994 | Deit et al. | 188/1.11 |
| 5,511,636 | 4/1996 | Tanaka | 188/1.11 |
| 5,520,265 | 5/1996 | Kobayashi et al. | 188/1.1 |

FOREIGN PATENT DOCUMENTS

| | | |
|---|---|---|
| 0596761 | 5/1994 | European Pat. Off. . |
| 7420058 | 11/1975 | Germany . |
| 2800501 | 7/1981 | Germany . |
| 107446 | 7/1982 | Japan ............... 188/1.11 W |
| 2109065 | 5/1983 | United Kingdom . |

*Primary Examiner*—Robert J. Oberleitner
*Assistant Examiner*—Pamela J. Lipka

[57] ABSTRACT

A brake lining wear indicator is attached to a drum brake shoe backing plate adjacent the brake lining. The indicator provides a visual gage dimension that assists in the determination of when the brake linings should be replaced. This determination can be made in a very short period of time without requiring a physical measurement of the thickness of the brake lining on each brake shoe.

20 Claims, 3 Drawing Sheets

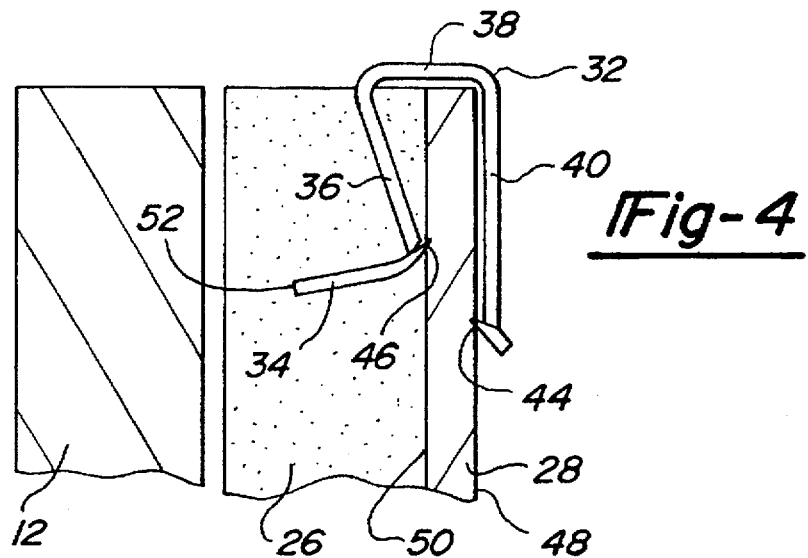
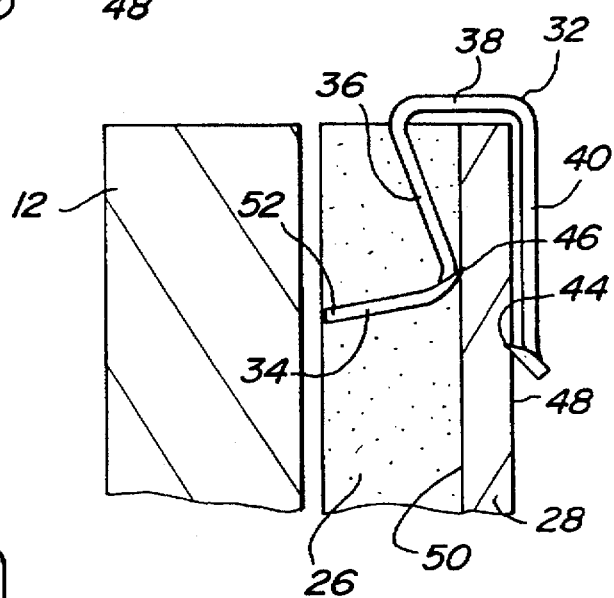
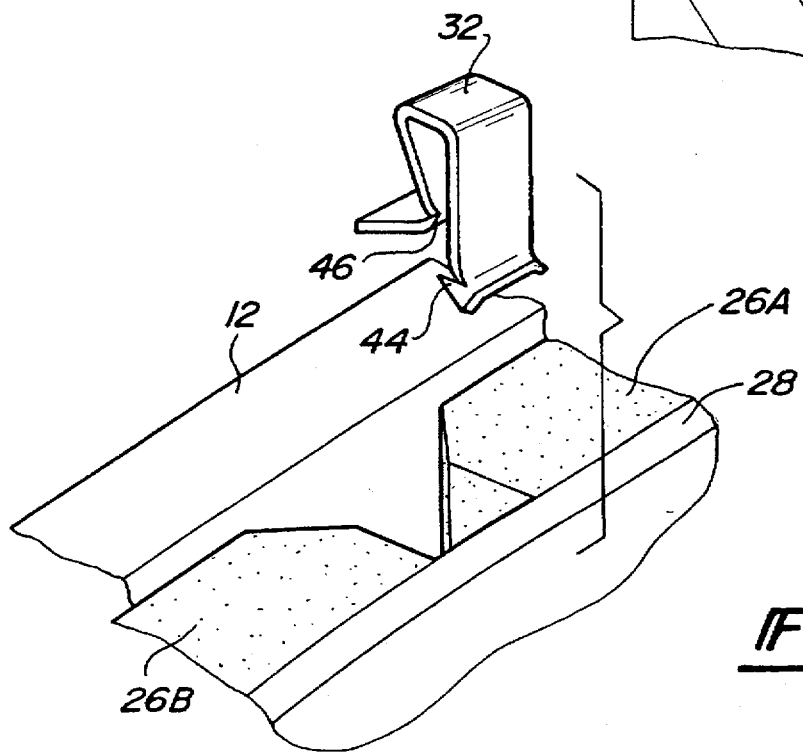

LINING WEAR INDICATOR FOR A DRUM BRAKE

BACKGROUND OF THE INVENTION

This invention relates to a unique brake lining wear indicator to be supported on a brake shoe backing plate of a drum brake assembly.

Drum brakes are widely used in vehicle braking systems. In a typical drum brake, two arcuate brake shoe assemblies are located inside a rotating cylindrical brake drum. Each brake shoe assembly includes a backing plate which carries brake lining friction material. A brake actuator moves the brake shoe assemblies toward the rotating brake drum such that the brake lining friction material contacts the inner surfaces of the drum, thus retarding the rotation of the drum. Over a period of time, the contact between the lining and the drum causes the lining to wear. If the lining becomes too thin, ineffective braking can occur. Thus, it is desirable to provide an indication when brake lining thickness is such that the brake shoes should be changed.

Several problems arise when trying to determine whether the brake linings have sufficiently worn such that they need to be changed. Often the wheel and the brake drum have to be removed from the vehicle for the brake lining thickness to be measured. This is cumbersome and time consuming. Thus, it is desirable to have an efficient way to visually inspect the lining thickness to determine whether the brake linings need to be replaced without having to physically measure the linings.

Brake lining wear indicators have been used as visual inspection tools in the prior art. Typically, these indicators have been incorporated into the lining material itself. Notches have been put into the sides of the lining material to visually signal when the linings need to be changed. Also, colored material has been inserted into the brake lining material at a predetermined height to serve as a visual indication to change the brake linings. These prior art systems have required modification of the lining material, which is undesirable. Thus, it is desirable to have a visually detectable brake lining indicator which can be easily attached to the brake shoe assembly and which is not incorporated into the lining material.

SUMMARY OF THE INVENTION

The subject invention relates to a drum brake system comprising a cylindrical drum with an inner surface and an outer surface disposed about an axis of rotation. A pair of arcuate brake shoe assemblies are located adjacent to the inner surface of the drum, with each brake shoe assembly including a backing plate and at least one brake lining segment attached to the backing plate. An actuator moves the brake shoe assemblies into contact with the inner surface of the drum. A brake lining wear indicator, located adjacent to the brake lining segment, is supported on the backing plate.

In a preferred embodiment of this invention, the indicator includes an indicator portion which extends upwardly away from a top surface of the brake shoe. By comparing the height of the indicator to the remaining amount of friction material on the brake shoe, one can determine whether the friction material has worn sufficiently such that replacement is recommended. In a preferred embodiment, a top portion connects the indicator portion to a side portion. The side portion is connected to a base portion. The base portion is received on a bottom side of the backing plate, with the top portion and indicator portion being received on a top side of the backing plate. The distance between the top portion and the base portion is less than the thickness of the base plate. Thus, when the indicator is received on the base plate, the top portion is biased away from the base portion, and a retaining force tends to bias the two back to their relaxed position. Barbs are preferably formed on each of the back and top portions, and the retaining force tends to force these barbs into the backing plate.

The invention offers a unique location for the brake lining wear indicator. The brake lining wear indicator can be easily attached to the backing plate of the brake shoe assembly and allows improved visual inspection to determine whether or not the brake shoe assemblies should be changed.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3C is a partial exploded view of a drum brake system utilizing the subject invention;

FIG. 4 is a cross sectional view taken along line 4—4 of FIG. 2; and

FIG. 5 is a Figure like FIG. 4 but showing a worn brake lining.

DETAILED DESCRIPTION OF A PREFERRED EMBODIMENT

Figure 1:
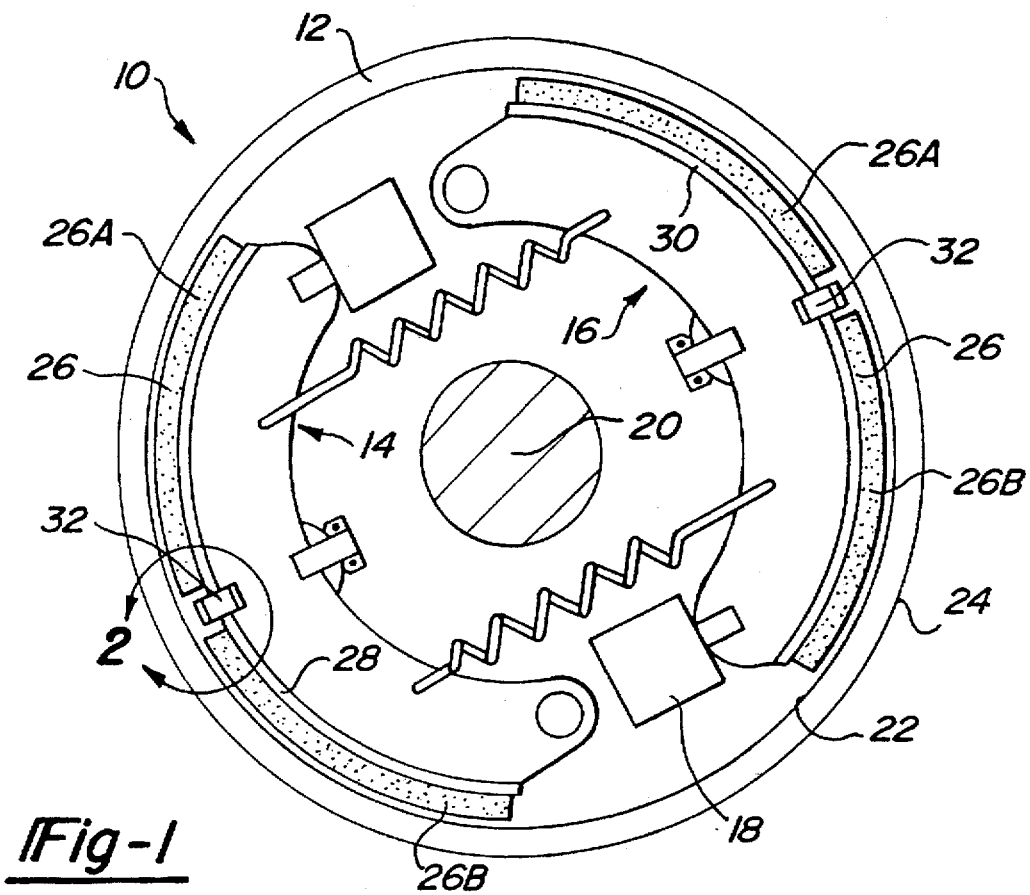
FIG. 1 is a side view of a drum brake utilizing the subject invention.

As shown in FIG. 1, a drum brake system 10 includes a cylindrical brake drum 12, a first brake shoe assembly generally shown at 14, a second brake shoe assembly generally shown at 16, and an actuator 18. The general operation of the drum brake system is known. The first 14 and second 16 brake shoe assemblies are preferably identical such that any description of the first brake shoe assembly 14 or its components is also applicable to the second brake shoe assembly 16. Drum brake system 10 can be of various types of systems such as an S-Cam brake, a wedge brake, or a drum brake actuated by a hydraulic cylinder. Actuator 18, shown schematically, represents any known actuating mechanism for drum brake systems such as an S-Cam mechanism, a wedge mechanism, or a hydraulic cylinder.

The brake drum 12, which rotates about an axis of rotation 20, has an inner surface 22 and an outer surface 24. The first brake shoe assembly 14, located adjacent to the inner surface 22 of the brake drum 12, includes a brake lining 26 comprised of a known friction material which is attached to a first backing plate 28. The second brake shoe assembly 16, located adjacent to the inner surface 22 of the brake drum 12, also includes a brake lining 26 comprised of a known friction material which is attached to a second backing plate 30. The brake linings 26 can be attached to the backing plates 28, 30 in various ways which are known in the art, such as by adhesives, by riveting or by other fastening of the linings 26 to the backing plates 28, 30. The brake linings 26 can be attached to the backing plates 28, 30 as single continuous portions, or can be broken into brake lining segments 26A, 26B spaced apart from one another. FIG. 1 shows the first 14 and second 16 brake shoe assemblies each with two brake lining segments 26A, 26B spaced apart from one another.

When braking occurs, the actuator 18 moves the first 14 and second 16 brake shoe assemblies into contact with the brake drum 12 such that the linings 26 contact inner surface 22 of the brake drum 12 to retard rotation of brake drum 12. The frictional forces created between the rotating brake drum 12 and the brake linings 26 cause the brake linings 26 to wear over time. As the brake linings 26 wear their thickness decreases. At a certain point, the brake linings 26 become so thin that they can no longer provide effective braking for a vehicle (not shown). It is desirable to provide an indication that the thickness of the brake linings 26 has decreased to an extent that recommends the brake shoes be changed.

Brake lining wear indicators 32, supported by the backing plates 28, 30 of the first 14 and second 16 brake shoe assemblies respectively, are used to indicate the proper discard thickness for the brake linings 26. The brake lining wear indicator 32 can be attached to the backing plates 28, 30 by frictional engagement. It should be understood that other attachment methods can be used.

Figure 2:
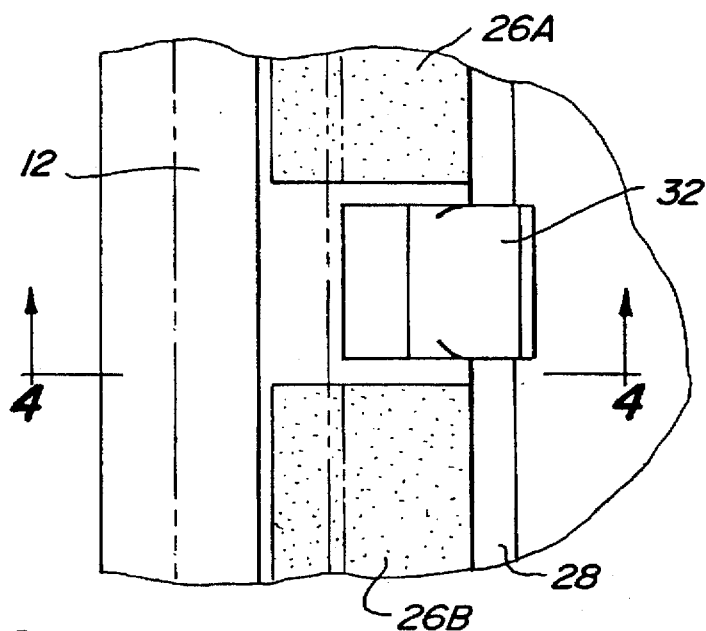
FIG. 2 is a magnified view of the portion of the drum brake enclosed in line 2 of FIG. 1.

As shown in FIG. 2, brake lining wear indicator 32 is located adjacent to the brake lining 26 and is frictionally retained on the backing plates 28 of the brake shoe assemblies 14, 16. The brake lining wear indicator 32 is preferably located between brake lining segments 26A, 26B.

Figure 3A:
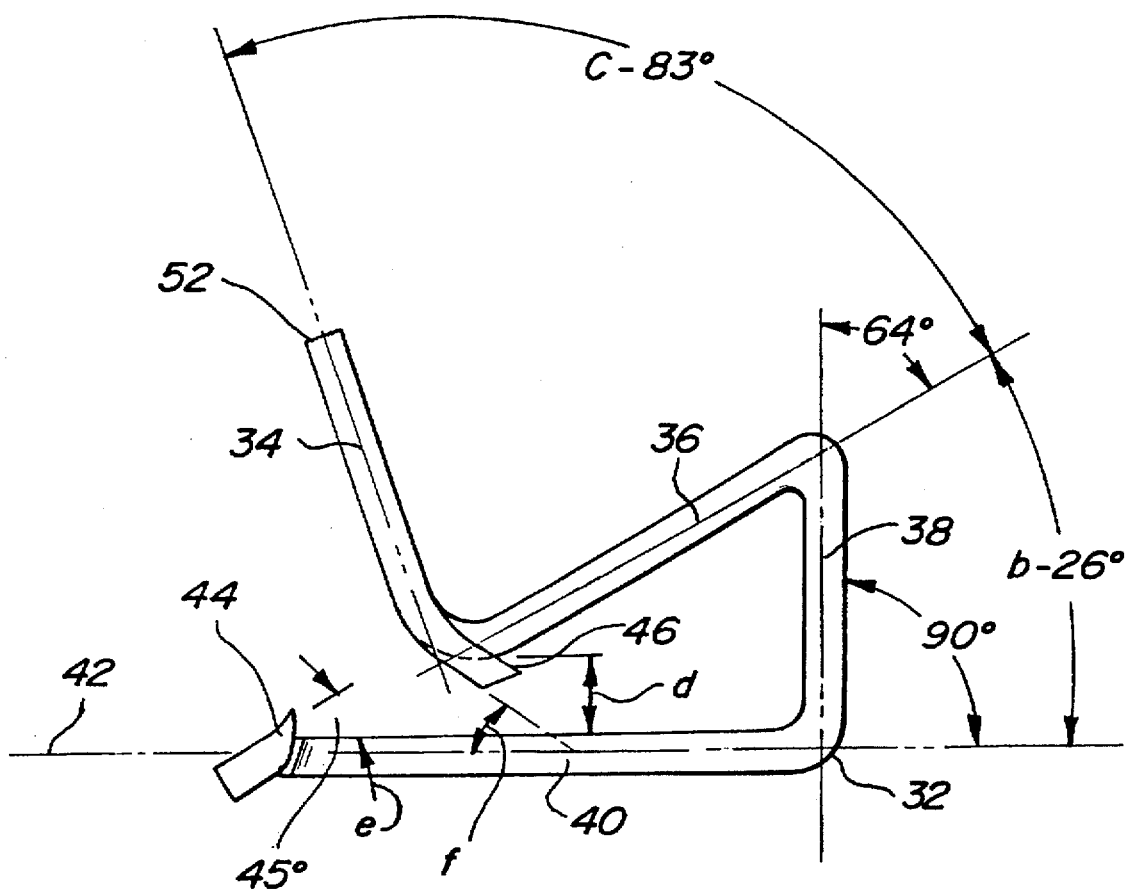
FIG. 3A is a side view of the subject invention.

As shown in greater detail in FIG. 3A, the brake lining wear indicator 32 includes an indicator portion 34, a top portion 36, a side portion 38, and a base portion 40 which defines a longitudinal plane 42. At least indicator portion 34 is made a bright color to increase its visibility. Preferably, the indicator 32 is formed of a suitable steel. The top portion 36 interconnects the indicator portion 34 with the side portion 38. The side portion 38 interconnects the top portion 36 with the base portion 40. The side portion 38 can either be at a non-parallel angle "a" relative to the longitudinal axis 42 of the base portion 40 or can be perpendicular to the longitudinal axis 42. In a preferred embodiment, the top portion 36 is at a non-parallel angle "b" relative to the longitudinal plane 42. A non-parallel angle "c" is defined between the top portion 36 and indicator portion 34. In the alternative, the indicator portion 34 can be at a perpendicular angle relative to the longitudinal plane 42.

Base portion 40 of the brake lining indicator 32 further includes a first pair of barbs 44 for engaging one side of the backing plate 28. The top portion 36 of the brake lining indicator 32 includes a second pair of barbs 46 for engaging an opposed side of the backing plate 28. In the preferred embodiment the first 44 and second 46 barbs are at non-parallel angles "e" and "f", respectively, relative to the longitudinal plane 42 of the base portion 40. The first 44 and second 46 barbs are spaced from each other by a first distance in a transverse direction, extending perpendicular to the longitudinal plane 42. The first distance is less than the thickness of the backing plate 28.

In one embodiment, the angle "a" is 90°, the angle "b" is 26°, the angle "c" is 83°, and the angles "e" and "f" are 45°. Of course, other indicators within the scope of this invention could have other angles.

Figure 3B:
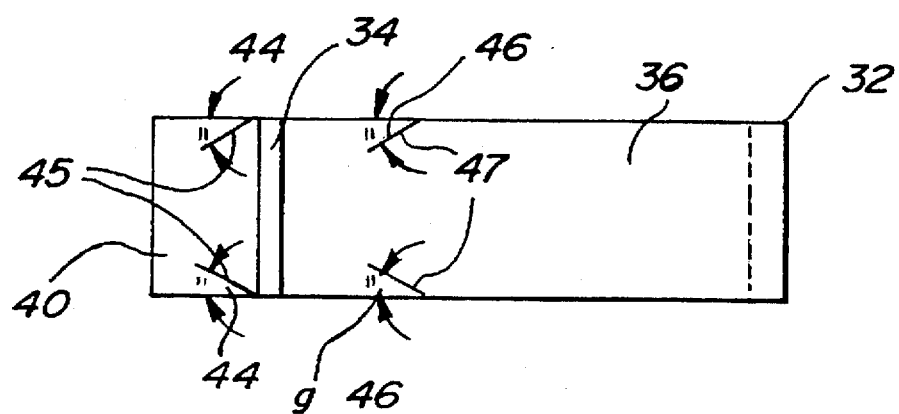
FIG. 3B is a plan view of subject invention.

As shown in FIG. 3B, barbs 44 and 46 can be formed by slitting 45 the indicator 36, and then deforming the material of indicator 36 to form the barbs. In one embodiment, the angle "g" as defined in FIG. 3B is approximately 30°.

FIG. 3C shows an indicator 32 snapping on backing plate 28 between brake lining segments 26A, 26B. The first 44 and second 46 barbs secure the indicator 32 to the backing plate 28.

As shown in FIG. 4, the backing plate 28 includes a first surface 48 and a second 50 surface, with the backing plate 28 being located between the base portion 40 and the top portion 36 of the brake lining wear indicator 32. First barbs 44 contact first surface 48 of backing plate 28 and second barbs 46 contact second surface 50 of backing plate 28. The engagement between first barbs 44 and first surface 48 of backing plate 28 and the engagement between second barbs 46 and second surface 50 of backing plate 28 results in the brake lining wear indicator 32 being frictionally retained on the backing plate 28. A secure connection is provided to ensure brake lining wear indicator 32 will not separate from the backing plate 28 during vehicle operation.

Prior to the brake lining wear indicator 32 being inserted onto the backing plate 28 of the brake shoe assembly 14, the top portion 36 is spaced apart from the base portion 40 by distance "d" as shown in FIG. 3A. When the brake lining wear indicator 32 is placed on the backing plate 28 of the brake shoe assembly 14, as shown in FIG. 4, the top 36 and indicator 34 portions are forced in a direction away from the base portion 40, transverse to the longitudinal plane 42, such that the distance is increased. Thus, top 36 and indicator 34 portions are deformed outwardly transversely to the base portion 40 when the brake lining indicator 32 is inserted onto the backing plate 28. A bias retaining force trying to return the indicator 32 to an undeformed or relaxed position is thus created. The bias further secures the brake lining wear indicator 32 on backing plate 28 once installed. This retaining force also causes the first 44 and second 46 barbs to engage the first 48 and second 50 surfaces of the backing plate 28 respectively, thus assisting in the prevention of separation of the brake lining wear indicator 32 from the backing plate 28.

As shown in FIG. 4, the indicator portion 34 includes a distal end 52 located at a predetermined height with respect to the brake lining 26. Typically this predetermined height may coincide with the height h of rivet heads (shown schematically) which attach the brake lining 26 to the backing plate 28. The height of the rivet heads is often used as a gage of when it is desirable to change the linings. Obviously, other heights can be used as the gage.

As the brake lining 26 wears, the brake lining 26 thickness decreases until it corresponds to the predetermined height of the distal end 52 of the indicator portion 34 as shown in FIG. 5. Now an operator may visually inspect the brake shoe assembly 14 and determine that the brake shoe assembly 14 should be replaced.

Thus, the brake lining wear indicator 32 provides a visual gage dimension that assists in the determining when the brake linings 26 should be replaced. This determination can be made in a very short period of time without requiring a physical measurement of the brake lining 26 on each brake shoe assembly 14, 16. Also, the brake lining wear indicator 32 is easily installed in the brake shoe assembly 14 and is not incorporated into the brake lining 26 material, thus preserving the integrity of the brake lining 26 material.

The invention has been described in an illustrative manner, and it is to be understood that the terminology which has been used is intended to be in the nature of words of description rather than of limitation. Obviously, many modifications and variations of the present invention are possible in light of the above teachings. Thus, the following claims should be studied to determine the true scope.

We claim:

1. A drum brake assembly comprising:

a cylindrical drum with an inner surface and an outer surface disposed about an axis of rotation;

a pair of arcuate brake shoe assemblies each including a backing plate having a first surface and a second surface opposite from said first surface and at least one brake lining segment directly attached to said second surface of said backing plate, said brake shoe assemblies located adjacent said inner surface of said drum;

an actuator for moving said brake shoe assemblies into contact with said inner surface of said drum; and a brake lining wear indicator having a first member with a first barb extending outwardly from said first member and a second member with a second barb extending outwardly from said second member wherein said first barb grippingly engages said first surface of said backing plate and said second barb grippingly engages said second surface of supported on said backing plate.

2. An assembly as set forth in claim 1 wherein said brake lining wear indicator is located circumferentially spaced brake lining segments.

3. An assembly as set forth in claim 1 wherein said brake lining wear indicator is comprised of said first member, wherein said first member is a base portion defining a longitudinal axis, a side portion extending outwardly from said base portion and defining a first transverse axis, said first transverse axis intersecting said longitudinal axis at a first point, said second member wherein said second member is a top portion extending outwardly from said side portion and defining a second transverse axis, said second transverse axis intersecting said longitudinal axis at a second point different than said first point, and an indicator portion extending outwardly from said top portion and defining a third transverse axis, said third transverse axis intersecting said longitudinal axis at a third point different than said first and second points.

4. An assembly as set forth in claim 3 wherein said top portion and said indicator portion are deformed from a relaxed position and in a direction away from said base portion and transverse to said longitudinal axis plane when said brake lining wear indicator is attached to said backing plate.

5. An assembly as set forth in claim 3 wherein said indicator portion includes a distal end which is located at a predetermined height with respect to the brake lining segment.

6. An assembly as set forth in claim 3 wherein said base portion includes a pair of base slits extending inwardly toward said longitudinal axis from opposing edges of said base portion to form a first deformable portion.

7. An assembly as set forth in claim 3 wherein said base portion includes at least one base slit extending from a first edge inwardly toward a center of said base portion forming a first deformable portion.

8. An assembly as set forth in claim 7 wherein said base slit is adjacent to a distal end of said base portion such that said first barb is formed when said distal end is bent transverse to said longitudinal axis.

9. An assembly as set forth in claim 7 wherein said top portion includes at least one top slit extending from a second edge inwardly toward a center of said top portion forming a second deformable portion.

10. An assembly as set forth in claim 9 wherein said base slit is adjacent to a distal end of said base portion such that said first barb is formed when said first deformable portion is bent transverse to said longitudinal axis and said second barb is formed when said second deformable portion is bent transverse to said longitudinal axis.

11. A brake lining wear indicator comprising a base portion defining a longitudinal plane and including a first barb;

a side portion extending outwardly from said base portion such that a first angle is formed between said base portion and said side portion;

a top portion including a second barb and extending outwardly from said side portion such that a second angle is formed between said side portion and said top portion; and an indicator portion extending outwardly from said top portion such that a third angle is formed between said top portion incicator portionwherein said first angle is different than said second angle and said second angle is different than said third angle.

12. A brake lining wear indicator as recited in claim 11, wherein said first and second barbs are spaced from each other by a first distance in a transverse direction, extending perpendicular to said longitudinal plane, said first distance being less than the thickness of a backing plate which is to secure said indicator.

13. A brake lining wear indicator as recited in claim 11 wherein said first angle is greater than said second angle.

14. A brake lining wear indicator as recited in claim 13 wherein said third angle is greater than said second angle.

15. A brake lining wear indicator as recited in claim 11 wherein said second angle is less than ninety degrees.

16. A brake lining wear indicator as recited in claim 11 wherein said first barb extends outwardly from said base portion such that a fourth angle is formed between said first barb and said base portion, said fourth angle being less than ninety degrees.

17. A brake lining wear indicator as recited in claim 11 wherein said second barb extends outwardly from said top portion such that a fifth angle is formed between said second barb and said base portion, said fifth angle being less than ninety degrees.

18. A brake lining wear indicator as recited in claim 11 wherein said base portion includes at least one base slit extending inwardly from an edge of said base portion toward a center of said base portion forming a first deformable portion.

19. A brake lining wear indicator as recited in claim 18 wherein said top portion includes at least one top slit extending inwardly from an edge of said top portion toward a center of said top portion forming a second deformable portion.

20. A brake lining wear indicator as recited in claim 19 wherein said first barb is formed when said first deformable portion is bent transverse to said longitudinal plane and said second barb is formed when said second deformable portion is bent transverse to said longitudinal plate.

* * * * *